United States Patent

Heckman

[15] 3,701,090
[45] Oct. 24, 1972

[54] SHIPBOARD ACOUSTIC RECEIVER

[72] Inventor: Donald B. Heckman, Alexandria, Va.

[73] Assignee: AMF Incorporated

[22] Filed: Dec. 22, 1970

[21] Appl. No.: 100,650

[52] U.S. Cl. .................... 340/3 R, 340/3 E, 340/6 R
[51] Int. Cl. ............................................. G01s 9/68
[58] Field of Search ...... 340/3 E, 3 R, 6 R, 16 R, 1 C; 343/13 R

[56] References Cited

UNITED STATES PATENTS 3,460,060 8/1969 Abruzzo et al. ............. 340/3 E
3,545,000 12/1970 Heflinger ............... 340/6 R X Primary Examiner—Richard A. Farley
Attorney—George W. Price and Charles J. Worth

[57] ABSTRACT

A shipboard receiver, with means for initiating a coded command to an underwater transponder, which receives the transponder response while discriminating against ambient noise and computes and displays the slant range and bearing of a submerged package with the transponder from the receiver.

6 Claims, 7 Drawing Figures

INVENTOR
DONALD B. HECKMAN
AGENT

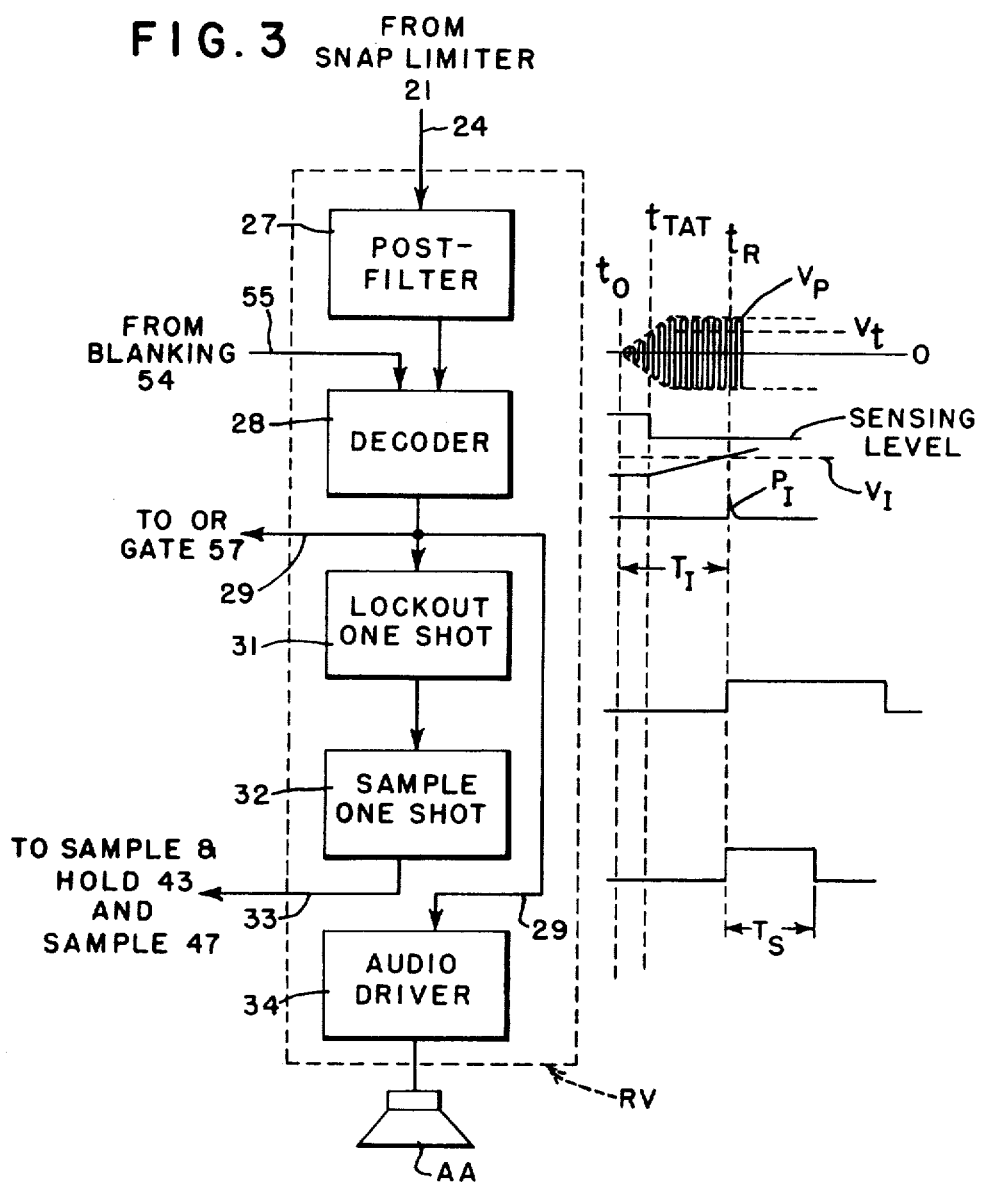

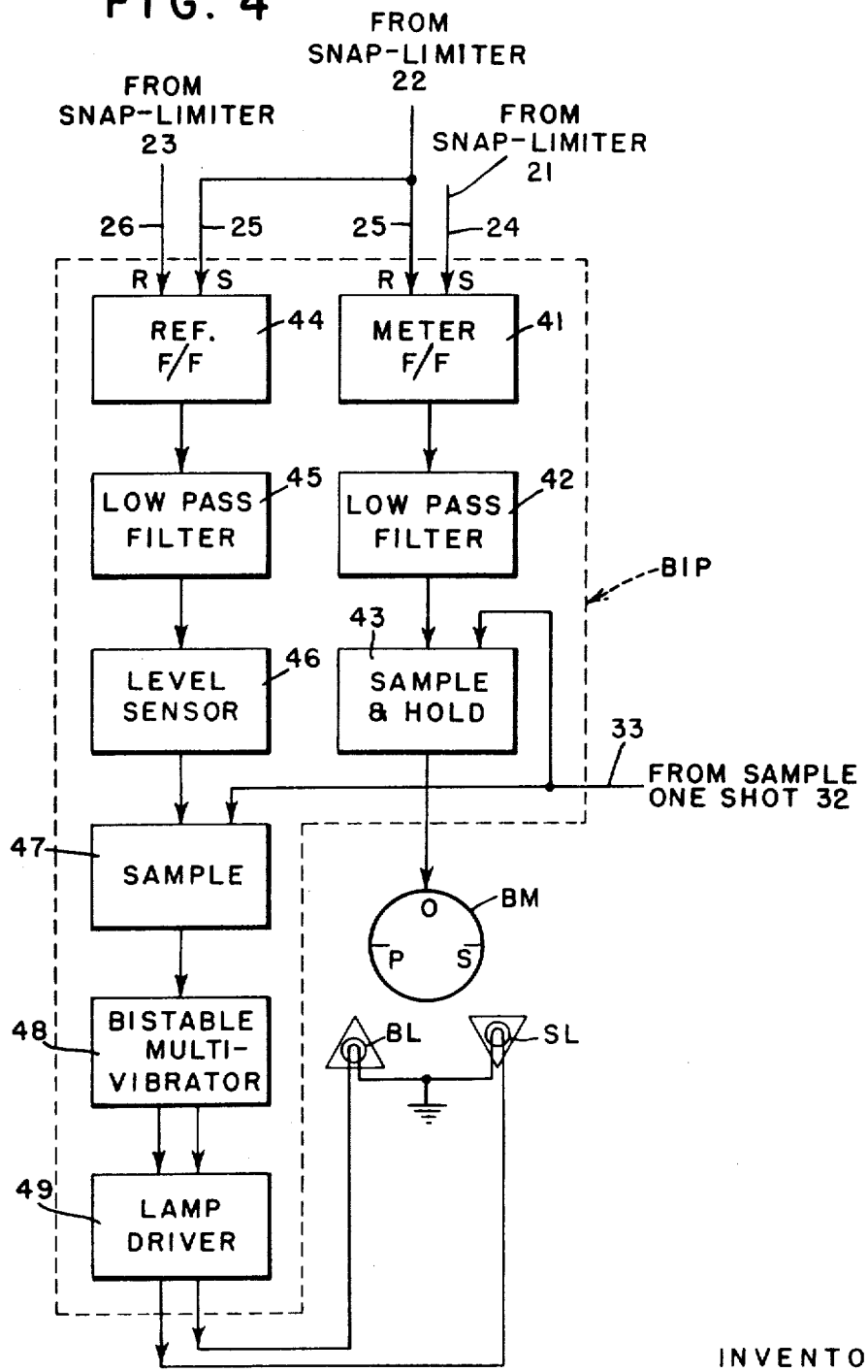

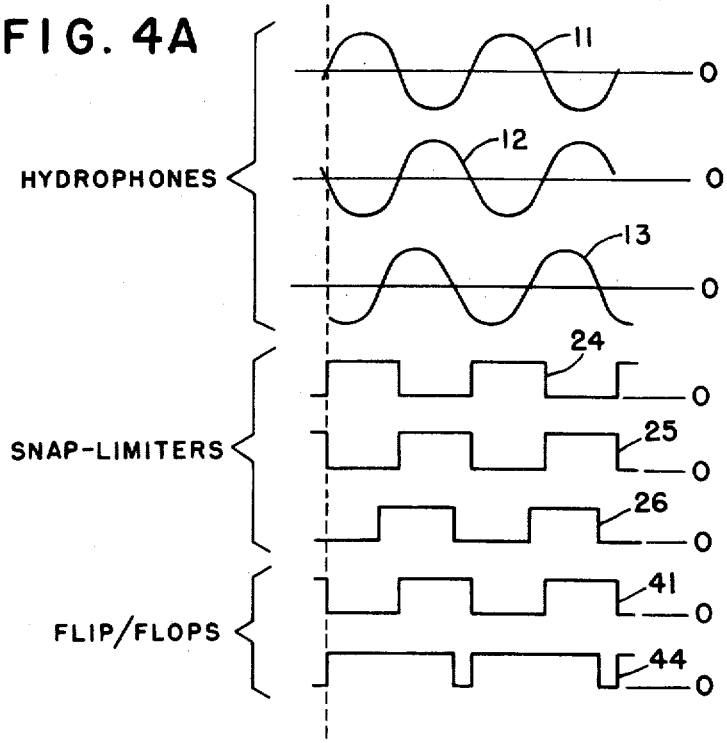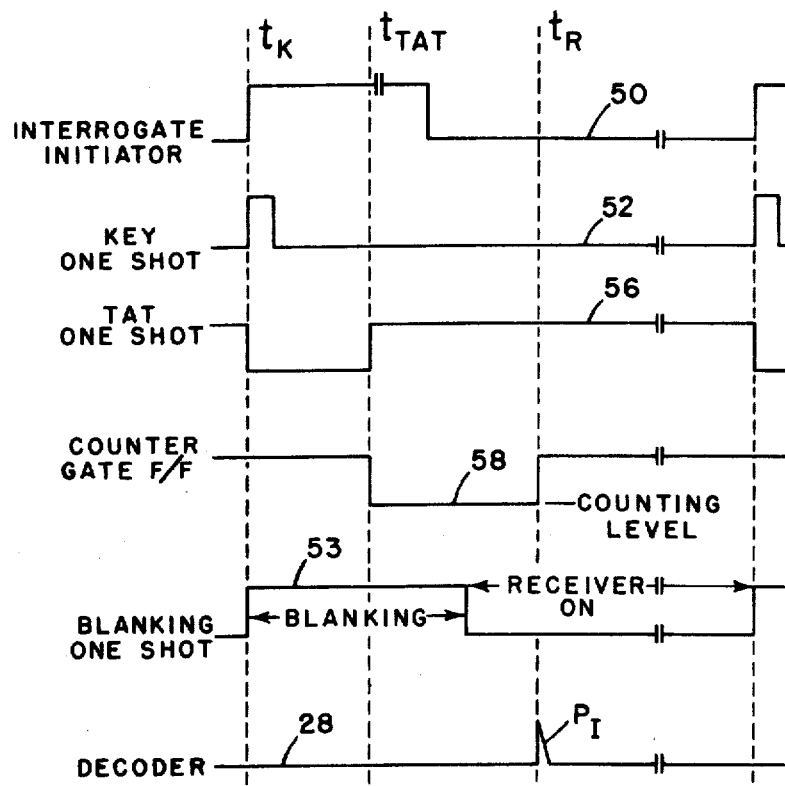

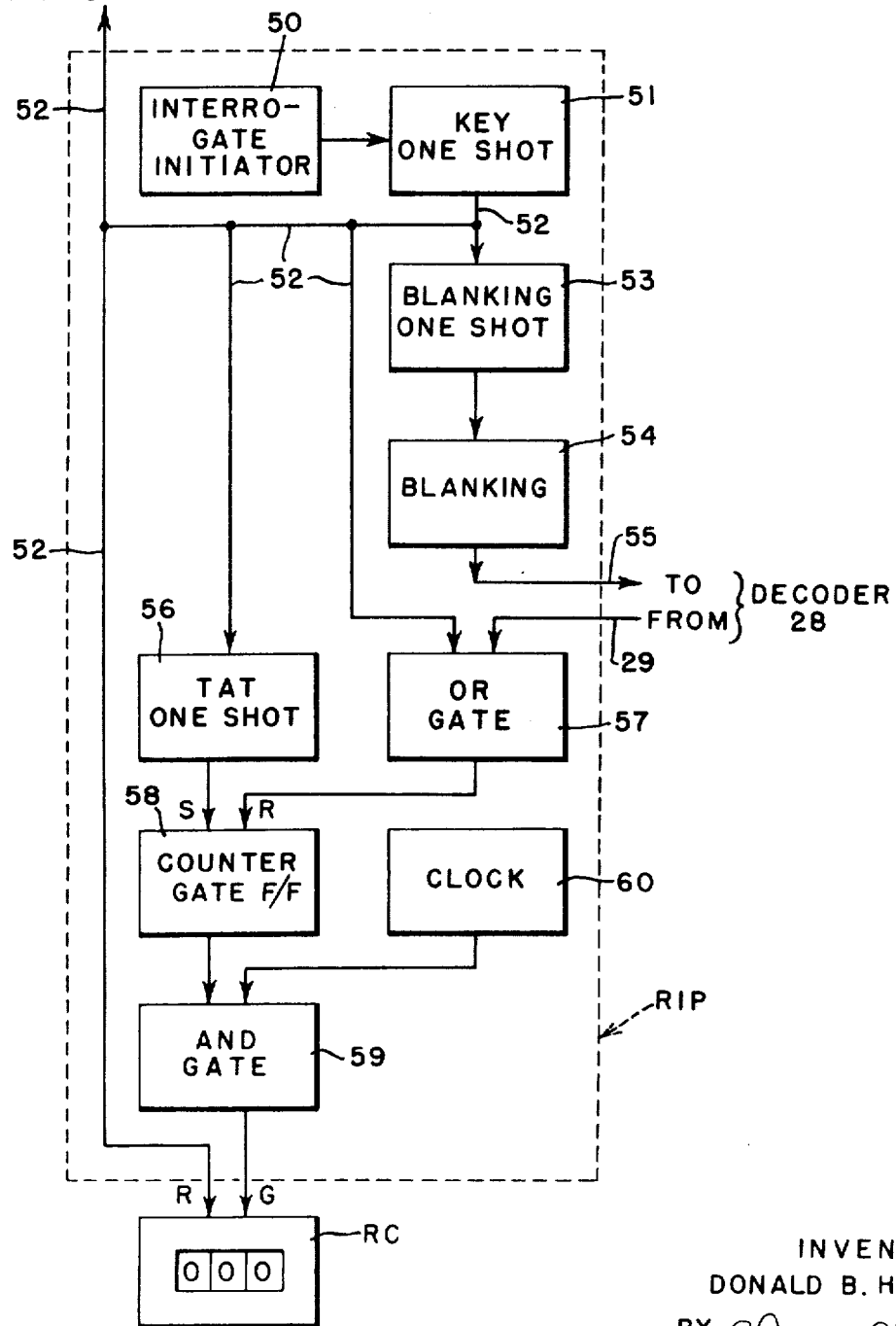

3,701,090

SHIPBOARD ACOUSTIC RECEIVER

SUMMARY OF THE INVENTION

This invention relates generally to underwater sound detection and more particularly to a shipboard receiver which computes and presents range and bearing information to a single underwater acoustic projector.

An object of the present invention is to provide a shipboard receiver capable of computing and presenting bearing and range information to a single submerged acoustic projector.

Another object of the present invention is to provide the foregoing receiver which utilizes phase comparison for determining bearing information.

Another object of the present invention is to provide the foregoing receiver which includes an analog meter and reference lights to provide bearing information.

And another object of the present invention is to utilize a 180° sector of the meter having greater than 180° of deflection and the reference lights to indicate whether the meter reading is the fore or aft 180° sector.

Still another object of the present invention is to provide the foregoing receiver which validates the signal.

And still another object of the present invention is to provide the foregoing receiver with interrogation initiating means.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

BRIEF DESCRIPTION OF THE DRAWINGS

FIG. 3 is a block diagram of the recognition and validation section of the receiver of FIG. 1.

FIG. 4 is a block diagram of the bearing information processing section of the receiver of FIG. 1.

FIG. 4A is a chart illustrating relative phase outputs discussed with respect to bearing information processing.

FIG. 5 is a block diagram of the range information processing station.

FIG. 5A is a chart illustrating various signals discussed with respect to range information processing.

DESCRIPTION OF THE INVENTION

Figure 1:
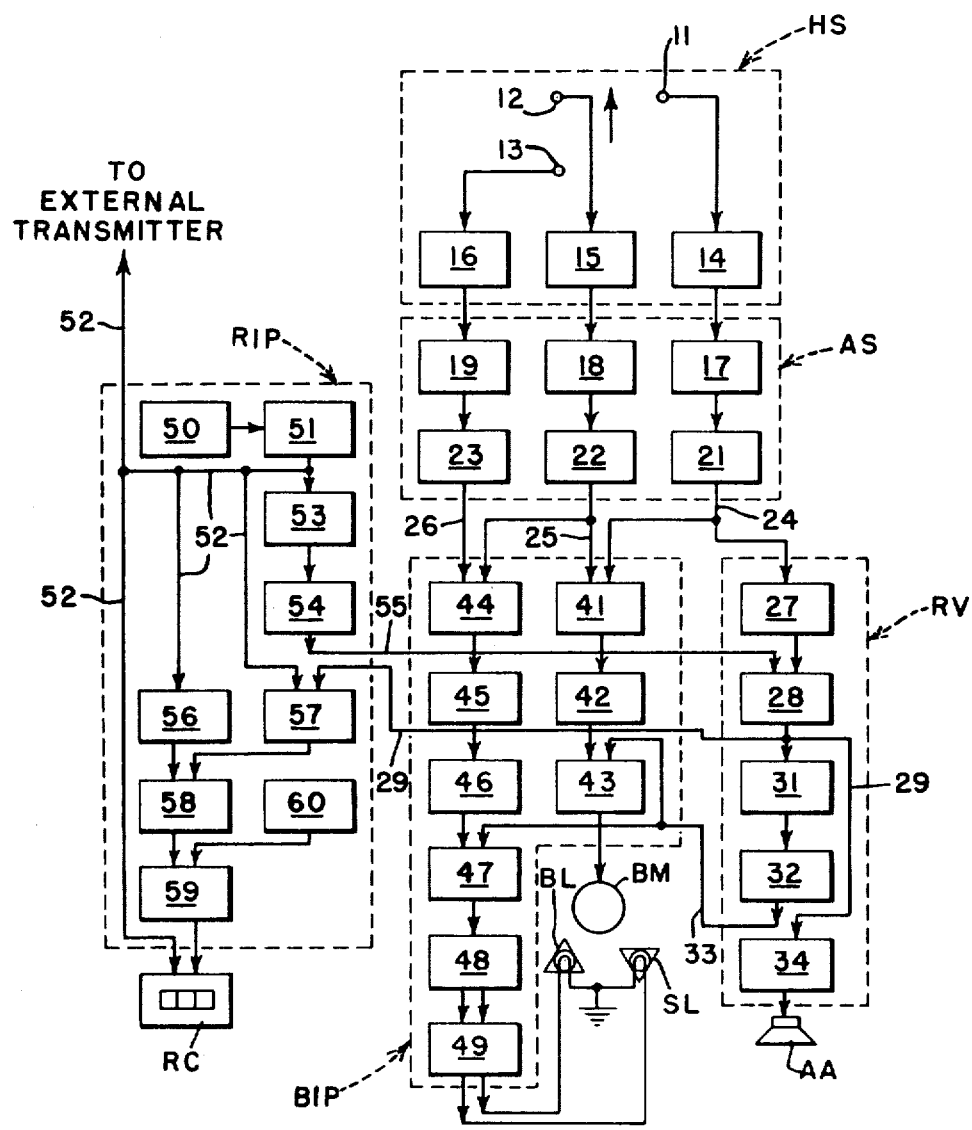
FIG. 1 is a block diagram of a receiver in accordance with the present invention.

Referring now to the drawings and particularly to FIG. 1, the novel receiver may be divided into five basic sections. These may be considered as a hydrophone or transducer section HS to receive acoustic signals, an analog section AS to amplify, filter and hardlimit input signals so that only the bandpassed frequency portion of each such signal is preserved, a recognition and validation section RV, a bearing information processing section BIP and a range information processing section RIP. The two information processing sections include information displays while the range information processing section also includes interrogation initiating controls.

Figure 2:
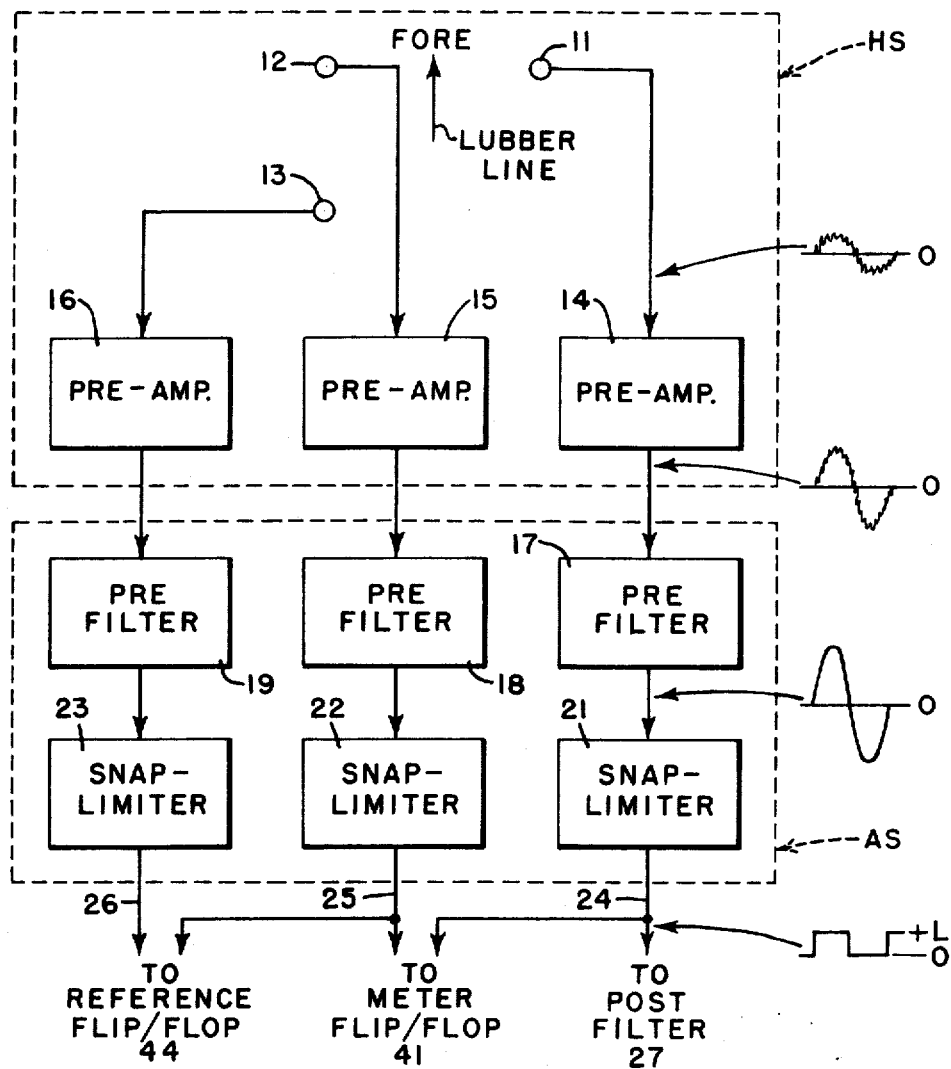
FIG. 2 is a block diagram of the hydrophone and analog sections of the receiver of FIG. 1.

Referring also to FIG. 2, the hydrophone and analog sections HS and AS are provided with three channels, each for the signals of a different one of three hydrophones 11, 12 and 13 which are wide band devices and are designed to be preferentially directional at a depressed angle so as to discriminate against surface reverberation and reflections.

The hydrophones are configured in essentially two crossed dipoles. Hydrophones 11 and 12 form one dipole and hydrophones 12 and 13 form another with the axes of the dipoles at 90° to each other, and the hydrophones of each of the dipoles are spaced less than one-half wavelength apart. Under signal conditions the average phase difference at the outputs of hydrophones 11 and 12 is processed so as to display the relative bearing to a submerged transponder or an acoustic projector on a bearing meter BM over a 180° sector. This information alone is ambiguous due to the symmetrical nature of a dipole. The average phase difference between hydrophones 12 and 13 is used to generate a reference display which removes such ambiguity by showing whether the 180° sector displayed on the bearing meter BM is the forward 180° or the aft 180° sector. The complete bearing display (see also FIG. 4) is thus made up of the bearing meter BM and a pair of lights; one light BL indicating the bearing as relative to the bow, and the other light SL indicating the bearing relative to the stern.

Broadband preamplifiers 14, 15 and 16, in this instance, providing approximately 20 db of gain are located inside the hydrophone section HS. These each provide a low output impedance which allows for flexibility in cabling between the hydrophone section HS and the electronics package or the remainder of the novel receiver.

The first stage in the electronics package, specifically in the analog section AS, consists of prefilters 17, 18 and 19; one for each of the three channels. The purpose of each of the prefilters 17, 18 and 19 is to provide additional gain and to remove noise beyond the frequencies of interest.

With the broadband preamplifier and a prefilter, as discussed above, a high gain limiting amplifier and a hardlimiter combine to form a nearly ideal snap-limiter. Three such snap-limiters 21, 22 and 23 are connected to the outputs of the respective prefilters 17, 18 and 19 to complete the analog section AS. The function of each snap-limiter is to amplify its input and to provide an output which is in either of two states; the high state (+L) or the low state (0). The output will be in the high state when the output from the input prefilter is instantaneously positive and in the low state when the output from the prefilter is instantaneously negative. Thus, all amplitude information is discarded. The output of each snap-limiter, since it is in either of one of two states, must be such that the level of these two states is very stable with respect to temperature effects and input level.

The output 24 of the snap-limiter 21 is connected to the input of a postfilter 27 in the signal recognition and validation section RV and the "set" input of a meter flip/flop 41 in the bearing information processing section BIP which is also provided with a reference flip/flop 44. The output 25 of snap-limiter 22 is connected to the "reset" input of the meter flip/flop 41, and the "set" input of the reference flip/flop 44 while the output 26 of the snap-limiter 23 is connected to the "reset" input of the reference flip/flop 44.

Referring now particularly to FIGS. 1 and 3, the postfilter 27 is a narrow band filter tuned to the reply frequency of the submerged transponder being interrogated or its acoustic projector. When a signal is present at the output 24 of the snap-limiter 21, which has a frequency content that falls within the bandwidth of the postfilter 27 and the signal is sufficiently above noise level, the output signal of the postfilter will be a CW or sinusoidal pulse which builds in amplitude as determined by the Q of the postfilter 27.

If the signal received from the output 24 of the snap-limiter 21 is present for a long enough duration of time so that its frequency is constant for an amount of time, the sinusoidal pulse at the output of the postfilter 27 to a decoder 28 will build up to the steady state or peak value $V_P$ of that frequency component of the snap-limiter output times the gain of the postfilter. With only noise present at the input of the postfilter 27, its output continually builds and decays but never reaches, for any significant amount of time, the steady state amplitude. The prefilter 17, the snap-limiter 21 and the postfilter 27 form a demodulation means utilizing the so-called hardlimiting technique.

The decoder or decoding network 28 is comprised of a level sensor and an integrator. The function of the level sensor is to determine when the postfilter output signal envelope has exceeded a threshold level called $V_t$. When the level sensor changes state to indicate that the threshold $V_t$ has been exceeded at its input, the integrator begins counting. As long as the envelope input to the level sensor remains above $V_t$ the integrator will continue to count until a predetermined time interval $T_t$ has expired or value $V_t$ has been reached. At this time the integrator presents a pulse $P_t$ at its output indicating that a valid signal pulse has been received from the submerged transponder or acoustic projector. Thus, the level sensor and integrator form a decoding network 28 which requires that the sinusoidal pulse coming from the postfilter 27 attain a certain level $V_t$ and that this level be exceeded for a predetermined length of time $T_t$. The purpose of this decoding network 28 is to make the novel receiver immune to oceanic and environmental noise. In short, it is required that the signal be at a certain frequency for a specific amount of time before recognizing this pulse as a reply signal from the underwater transponder.

When a signal from the underwater transponder or acoustic projector is recognized and validated, a pulse $P_I$ present in the output 29 of the decoder 28 will activate an audio driver 34 to generate a signal by use of an audio alarm AA such as a horn to alert an operator. The output pulse $P_I$ also is provided to an "or" gate 57 in the range information processing section RIP (see FIG. 5) which "resets" a counter gate flip/flop 58 and stops the range counter RC, as will be further discussed. Simultaneously, a lockout one shot 31 is also activated by pulse $P_I$ to prevent processing of reflections and reverberations immediately following the direct path reply from the submerged transponder, and a sample one shot 32 is triggered and provides an output $T_S$ which allows signal processing to take place for a pre-established time period. Since the transponder sinusoidal pulse reply width is set for a given amount of time, the sample period $T_S$ is chosen so as to operate only for the time of direct path arrival for determining bearing to the underwater transponder.

To consider the bearing information processing section BIP as shown in FIGS. 1 and 4, FIG. 4A must be referred to for graphic illustration of selected relative phase outputs and FIG. 2 must again be considered. The output of the snap-limiter 21 sets the meter flip/flop 41 which is reset by the output of snap-limiter 22. Hydrophone 11 is wired in opposite polarity with respect to the hydrophone 12. Thus, at a relative bearing of 0°, the electrical phase shift between hydrophones 11 and 12, and between the outputs of the snap-limiters 21 and 22, is 180°. The output of meter flip/flop 41 has a 50 percent duty cycle and as the relative bearing changes, the flip/flop output deviates about this 50 percent duty cycle. The hydrophones must be properly spaced so as not to allow the signal plus noise phase exceed 0° or 360° which would result in erroneous bearing information. In fact, it is possible and desirable to space the hydrophones in such a manner so as to utilize a 180° segment, of an analog meter movement with greater than 180° deflection, to correspond to relative bearings over a 180° sector.

The output of the meter flip/flop 41 is passed through a low pass filter 42, the output of which is the average value at the output of the flip/flop. The output of the filter 42 therefore is a function of the average phase difference between the outputs of snap-limiters 21 and 22, offset by 180°. The output of the low pass filter 42 is sampled for approximately four of its time constants when signal is detected after which this value is held by a sample and hold means 43 when enabled by the signal $T_S$ from the sample one shot output 33. This value is read out on or presented by the relative bearing meter BM. This bearing information is ambiguous because the relative bearing may lie in either the forward or aft 180° sector.

The output of the snap-limiter 22 sets the reference flip/flop 44 which is reset by the output of the snap-limiter 23. Hydrophone 13, like hydrophone 11, is wired in opposite polarity with respect to hydrophone 12. The output of the reference flip/flop 44 is passed through a low pass filter 45 to a level sensor 46 which is used to determine whether the average value at the output of the flip/flop 44 is above or below a threshold corresponding to meter bearings relative to the bow or to the stern. The output of the level sensor 46 (which is binary) is sampled by a sample circuit 47 during the above-explained sample period and determines the state of a bistable multivibrator or flip/flop 48. The output of this multivibrator 48 through a lamp driver means 49 turns on the appropriate reference lamp; either bow light BL or stern light SL. This removes ambiguity and completes the displayed bearing information.

Referring now to FIGS. 1, 5 and 5A, the range information processing section RIP is arbitrarily provided with an interrogator means 50 which causes a key one shot circuit 51 to provide a pulse to its output 52. The primary purpose of the range information processing section RIP is to compute and display the slant range of the novel receiver to the submerged transponder or acoustic projector if a valid reply has been received taking into account the total system (underwater transponder and receiver), turn-around or decision time (TAT). The interrogate initiator stage or means 50 initiates interrogation at $t_K$ manually by depressing an interrogation pushbutton or remotely by a remote trigger (not shown). Repetitive keying (not shown) is also available by use of a UJT relaxation oscillator or the like. The initiator signal triggers the key one shot monostable 51 at $t_K$ at which time an interrogate pulse is initiated by its output 52 and starts the precise timing events. Once triggered, the output pulse of the key monostable multivibrator 51 triggers an external shipboard transmitter (not shown) to interrogate an underwater transponder at $t_K$. In addition to triggering the interrogation command to the underwater transponder, it triggers the blanking range one shot or monostable multivibrator 53, resets a counter gate flip/flop 58 through the "or" gate 57 if no previous reply was received, resets the digital display or slant range counter RC to a zero count and triggers the turn-around time one shot or monostable multivibrator 56. The purpose of the turn-around time monostable multivibrator 56 is to subtract the total system turn-around or decision time from the total two-way travel time of the acoustic pulse plus the time that is required for decision making in the underwater transponder and relocation receiver, leaving the true two-way travel time to be read out in terms of one-way range. At the end of the turn-around time period $t_{TAT}$, the counter gate flip/flop 58 is set and starts to display RC to counting at the frequency of a clock 60. The output of the clock oscillator 60 is applied to one input of the AND gate 59, and the output of the counter gate flip/flop 58 is applied to its other input so that whenever the counter gate 58 is in the ON condition, the display RC has clock pulses applied to its gate terminal.

The output of the blanking range monostable multivibrator or one shot 53 has a period corresponding to the minimum one-way range of the system, and is applied to a blanking circuit 54 which provides a signal through its output 55 to the decoder 28 whereby the receiver is blanked or disabled and is not allowed to detect replies at any range less than that set into the blanking range monostable multivibrator 54. Blanking reduces the possibility of the receiver replying to a surface reflected interrogation when receiving on a frequency near the interrogation frequency. If after the blanking a proper transponder reply is received, the output pulse $P_I$ from the decoder 28 (at time $t_R$) coupled through the OR gate 57 resets the counter gate flip/flop 58, stopping the accumulation of clock pulses in the digital display RC. The count, which represents the slant range to the transponder, is visually displayed on the counter RC.

During intended normal operation, the false alarm probability of the receiver is negligibly small due to the security derived through the signal recognition or decoding stage RV. The decision time required for this recognition, both in the underwater transponder and the navigation receiver, is an accurately controlled and predictable value $t_{TAT}$ which is subtracted from the total time. This leaves only the true acoustic travel time to be read in the form of one-way range to a transponder.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A receiver for computing and presenting bearing and range to an underwater acoustic projector, comprising hydrophone means for receiving acoustic signals and for providing electrical signals in response to such acoustic signals received;

means for providing three phase related frequency signals in response to electrical signals from said hydrophone means;

recognition means connected to receive a first of said frequency signals and to provide an output signal when said first frequency signal represents a valid acoustic signal;

bearing information processing means enabled by an output signal from said recognition means, having a first portion including an analog bearing meter with a zero center 180° sector presentation and a second portion including a pair of lights of which one indicates the meter presentation is forward of said hydrophone means and the other indicates the meter presentation is aft;

said first portion receiving and comparing the phases of said first frequency signal and a second of said frequency signals, and providing an analog signal representing phase difference to said bearing meter;

said second portion receiving and comparing the phases of said second frequency signal and the third of said frequency signals, and providing an output representing phase difference for selectively energizing one of sad lights; and range information processing means including counter means for presenting range information, clock means for providing pulses to drive said counter means and gate means controlling transmission of such clock pulses;

said gate means being set by an interrogate command to pass clock pulses to said counter and reset by an output signal from said recognition means.

2. The receiver in accordance with claim 1, and said first portion of said bearing information processing means comprising a meter flip/flop set by said first frequency signal, reset by said second frequency signal and having an output with a 50 percent duty cycle and which deviates about this duty cycle as relative bearing changes;

low pass filter means connected to said meter flip/flop to receive the output therefrom and provide an output signal which is the average value of the meter flip/flop output; and a sample and hold circuit connected to said low pass filter means and said bearing meter means, and which samples and holds the low pass filter means output when enabled by the output signal from said recognition means and presents such sampled value to said bearing meter.

3. The receiver in accordance with claim 1, and said second portion of said bearing information processing means comprising a reference flip/flop set by said second frequency signal and reset by said third frequency signal;

low pass filter means connected to said reference flip/flop to receive the output therefrom and provide an output signal which is the average value of the reference flip/flop output;

level sensing means providing a threshold being connected to said filter means for receiving the output therefrom;

said level sensing means comparing said filter means output to said threshold and providing a binary output representing difference between the compared signal and the threshold;

circuit means connected to said level sensor means for sampling the binary signal when enabled by the output signal from said recognition means;

a bistable multivibrator connected to said circuit means and responsive to said sampled binary circuit; and a driver circuit connected to said multivibrator and lamps, and selectively causing one of said lamps to be energized as determined by the instantaneous state of said multivibrator.

4. The receiver in accordance with claim 3, and said first portion of said bearing information processing means comprising a meter flip/flop set by said first frequency signal, reset by said second frequency signal and having an output with a 50 percent duty cycle and which deviates about this duty cycle as relative bearing changes;

another low pass filter means connected to said meter flip/flop to receive the output therefrom and provide an output signal which is the average value of the meter flip/flop output; and a sample and hold circuit connected to said other low pass filter means and said bearing meter means, and which samples and holds the other low pass filter means output when enabled by the output signal from said recognition means and presents such sampled value to said bearing meter.

5. The receiver in accordance with claim 1, and said range information processing means further comprising interrogation initiating means including a pulse circuit having an output connected to said gate means, said counter means and adapted for connection to an interrogation transmitter;

said circuit when triggered providing a pulse at its output to instantaneously reset said gate and counter means; and a delay circuit connected to said pulse circuit and gate means to set said gate means after a predetermined time delay after interrogation is initiated.

6. The receiver in accordance with claim 5, and means responsive to a pulse from said pulse circuit for disabling said recognition means for a predetermined time period after interrogation is initiated to prevent validation of a reflected interrogation signal.

* * * * *